Oct. 11, 1955  P. CAMESCASSE ET AL  2,720,454
METHOD OF REDUCING MgO IN THE SOLID PHASE
Filed March 27, 1952
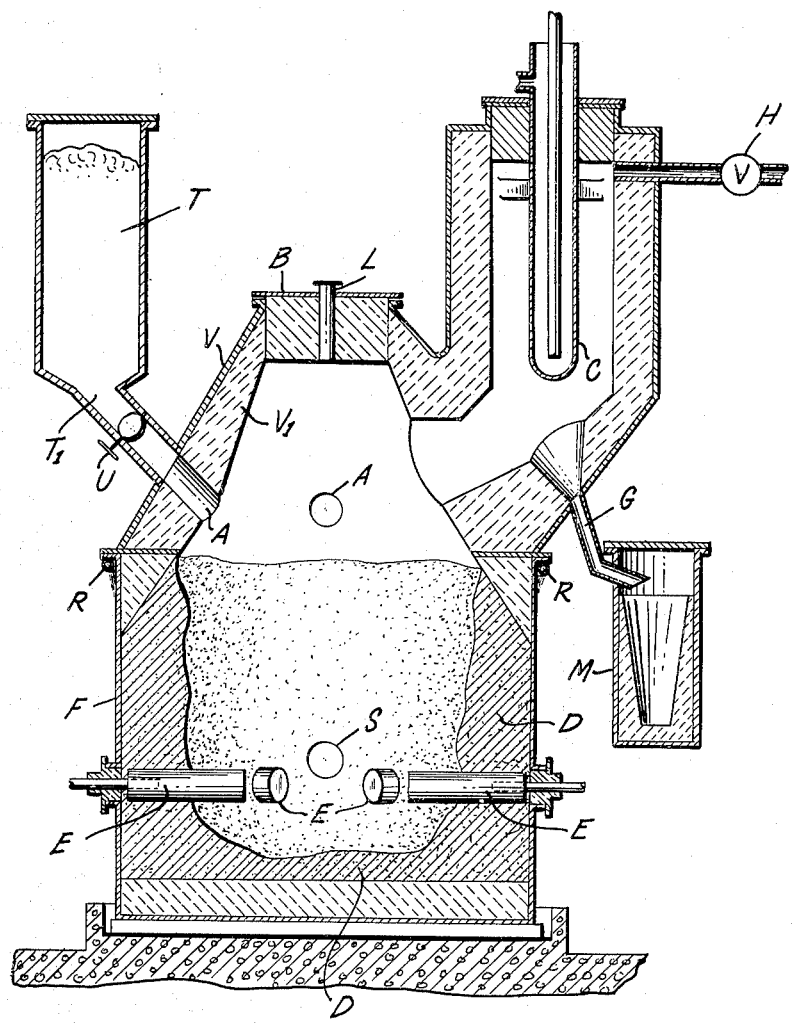
INVENTORS.
PIERRE CAMESCASSE &
FRANCOIS MATHIEU

United States Patent Office 2,720,454
Patented Oct. 11, 1955

2,720,454

METHOD OF REDUCING MgO IN THE SOLID PHASE

Pierre Camescasse, Baudean, and Francois Mathieu, Grenoble, France, assignors to Soberma, Paris, France, a corporation of France Application March 27, 1952, Serial No. 278,854

14 Claims. (Cl. 75—10)

It is known magnesium may be commercially produced by reducing at elevated temperatures magnesium oxid— or compounds containing the same—by means of reducing agents yielding non-volatile oxidation products, such as silicon, aluminum, calcium carbide, etc. When the reducing agent is silicon or aluminum and the material to be reduced is burnt dolomite, the reaction product consists of a slag of calcium silicate or calcium aluminate, or a mixture thereof. Magnesium escapes as a vapor and is gathered on a suitable cooler. Former industrial operations have been carried out in retorts, which were fed with the reaction mixture, said mixture comprising a reducing agent and the magnesia-containing raw material previously ground and sintered into pellets. The sizes of these retorts were limited because of the low thermal conductivity of the reaction mixture, and their output did not exceed 10 to 20 kilos for a single batch operation, although by using rotating furnaces, and thus renewing the surfaces exposed to heat, the output capacity of these units could be somewhat increased. Building large production units was practicable only to the extent that the electrical conductivity of the reaction mixture and of the reaction products could be used to obtain, by Joule's effect, a quick and powerful heating of the whole mass. Passing current through the mass of a solid reaction mixture could not be practically considered, for its electric conductivity quickly increases with rising temperature, and it is not easy to obtain a stable normal working and to avoid the smelting of the reaction products. Stability provided by passing heat through the liquid phase was tried, the reaction to be operated within this phase. In that case the reaction rate appeared to be much lower, and besides, the reduction of magnesia dissolved in the liquid phase became slower.

The process which is the object of the present invention and which aims at obviating the foregoing disadvantages, consists in carrying out the reduction of magnesia, or compounds containing the same, in a furnace in which there is a slag in liquid state; the reaction mixture, previously ground and thoroughly mixed, is poured on the surface of the liquid slag; the proportion of this reaction mixture which is in every batch brought into contact with the molten slag, is so predetermined that the amount of heat absorbed by the mixture from the slag, is sufficient to cause the latter partially to solidify in its upper part (particularly on its surface). However, said proportion is so chosen that the amount of heat absorbed is not large enough to excessively decrease the temperature at the surface of the slag. Since decreasing temperature means slowing down chemical reaction, the lower the temperature is the longer the time required for the reduction of the magnesia. As it is always desirable that industrial operations are as rapid as possible, the process of the invention is, for this reason, preferably carried out above 1300° C. The pulverant mixture which floats upon the molten slag surface is instantaneously heated in its solid phase to the reducing temperature. The reduction is thus very quick and takes place almost completely before the charge is dissolved in the molten slag.

The heat to be applied to the molten slag, to maintain it in liquid state, to heat the pulverant charge and to balance the endothermicity of the reaction is obtained preferably by passing electrical current through the slag by using its electrical conductivity at reaction temperatures; in this case current is led by means of electrodes plunging in the liquid slag and preferably wholly submerged in this slag which acts at once as a heat resistor and as a thermal regulator yielding a part of its heat to the pulverant charge.

The molten slag is composed for a major proportion, and even sometimes wholly, by oxids carried by raw material or issued from the reduction. The smelting temperature of such a slag is near 1350° C. The quantities of the mixture of the reducing agent, and the magnesia-containing compounds, that are simultaneously conveyed to the surface of a given quantity of molten slag are predetermined. The mixture weight composing the charge should preferably be between 10% to 18% of the weight of the molten slag in accordance with the slag temperature varying from 1500° to 1650° C. When the current electrodes are wholly submerged in the molten slag, the degree of working temperature of the slag is only limited by the temperature of oxidation of graphite electrodes by the dissolved magnesia. In the process according to the invention, magnesia reduction is effected in the solid phase by contact of molten slag which practically only dissolves oxids resulting from the reduction: alumina, silica, lime and a very little of magnesia; thus the working temperature may be raised up to 1650°, without any carbon monoxide formation. The following may be taken as the base formula:

$$\frac{\text{mixture weight}}{\text{molten slag weight}} \text{ approximately equals } \frac{T-F}{T}$$

T being the operating temperature and F the melting point of the slag. Variations from these values should not exceed 30% and it is preferable that they do not exceed 10%. If the melting point of the slag, for instance, is 1350° C., the base formula would become $$\frac{\text{mixture weight}}{\text{molten slag weight}} = \frac{1650-1350}{1650} = \frac{1}{5.5}$$

i. e. that for a molten slag of 1500 kilos the weight of mixture simultaneously charged would be:

$$\frac{1,500}{5.5} = 272 \text{ kilos}$$

the divergence from which preferably not exceeding 27 kilos. Similarly, for a working temperature of 1500° the formula would be:

$$\frac{\text{mixture weight}}{\text{slag weight}} = \frac{1}{10}$$

i. e. for 1500 kilos of slag, a mixture weight of 150 kilos with a maximum divergence preferably not exceeding 15 kilos.

We now summarize, for emphasis, what has been explained in the preceding paragraph. In order that the reaction between the ingredients of the pulverant mixture shall always take place in the solid phase in accordance with the invention, it is essential that each batch or charge of the mixture, when it contacts with the molten slag, shall partially solidify the slag to the extent of forming a crust thereon at or near the surface thereof, and that this shall occur without excessively reducing the temperature at the surface of the slag bath, for example, below 1300° C.; for otherwise the reaction would be considerably slowed. Accordingly, the ratio between the weight of each successive batch or charge of the mixture and the weight of the slag present at the time, should not be so large on the one hand as to reduce the surface temperature of the bath below that at which reaction will occur rapidly or, on the other hand, so little as to prevent the formation of the aforesaid crust. Experience has shown that by keeping said ratio between values $$1.3 \times \frac{T-F}{T}$$

and $$0.7 \times \frac{T-F}{T}$$

will safely accomplish this result.

When communication is maintained between the vessel containing the slag and a vacuum pump during the feeding, a small quantity of introduced dust is entrained towards the condenser and spoils the collected magnesium. Sufficiently spaced batch feeding allows shutting the communication with the vacuum at the very moment when powdered mixture falls on the liquid slag and for two or three minutes later in order to avoid any entrainment of dust towards the condenser.

An advantageous way of practicing the invention consists in using an air-tight furnace comprising a reaction vat constituted by a vessel outwardly cooled and having electrodes penetrating therein. At the outset the reaction vessel is loaded with the slag to be melted; for instance, calcium silico-aluminate resulting from a former operation, and usual devices of electro-thermal melting are employed, and action is started by the breaking of an arc between electrodes. An electrically-heated resistor may equally well be used, or even an alumino-thermal cartridge, or any other means for obtaining the fusion of the mass. It is preferable to charge the furnace with a sufficient quantity of slag in order that, after it has been melted, the electrodes will be immersed. When the molten slag bath is formed the temperature is maintained by Joule's effect, by controlling either the distance between the electrodes or the voltage applied between them, for instance, with a variable voltage transformer.

As the operating temperature is reached by the molten slag a first charge of the reducing agent and magnesia or compound containing it is poured on the surface of the slag; then magnesium vapor begins to escape and is preferably condensed to a liquid state. When all the magnesia has been reduced a new charge is allowed to fall and so on. When the upper part of the vessel is reached by the molten slag a part of the slag is withdrawn while a sufficient amount of slag is kept in the lower part of the vessel in order that the electrodes shall remain immersed.

The process according to the present invention may be applied without the use of reduced pressures. However a better furnace yield, as well as a lower electrical energy consumption, are involved when operating under reduced pressure. Using pressure between 20 and 100 mm. Hg is recommended for the reduction may be operated with good furnace output and with a condensation yield neighboring the unity, as while magnesium is recovered in liquid state. The metal may also be condensed in solid state.

One of the following mixtures is preferably used for the reduction of MgO:

|  | Per cent |
|---|---|
| 1. Ferro-silicon with 75% Si | 15 |
| Burnt dolomite with 34% MgO | 85 |
| 2. Ferro-silicon with 75% Si | 17.6 |
| Burnt dolomite with 34% MgO | 73.3 |
| Magnesia | 9.1 |
| 3. Ferro-silicon with 75% Si | 11.0 |
| Silico-aluminum with 33-45% Al | 8.0 |
| Burnt dolomite with 34% MgO | 67.0 |
| Magnesia | 14.0 |

An apparatus suitable for practicing the invention is illustrated in the single figure of the accompanying drawing. Said apparatus comprises a furnace formed with an iron vessel F which is fed with three-phase current by 6 horizontal graphite electrodes E. The vessel is surmounted with a tapered sleeve V, having an internal refractory lining $V_1$ and closed with a stopper B likewise thermally insulated. The tapered sleeve is connected with a cylindrical condensation chamber with an axially disposed iron condenser C, cooled by water circulation. The inner part of the condensation chamber is so arranged that magnesium is allowed to be withdrawn in liquid state. The metal is directed by a spout G into a thermally insulated pot M. Electrical energy is supplied at a low voltage between 50 and 110 volts. Power may reach 120 and even 150 kw. yielding an output of 12 to 15 kilos magnesium per hour. First starting is made by an arc, between a movable electrode, passing through the casting gate S and an opposite electrode.

The excess of exhausted slag, which is not required for a further operation, is poured through the side-outlet S, for instance, every 24 hours. When the operation is carried out under reduced pressure the vacuum must be broken from time to time; and advantage is taken of this for withdrawing magnesium recovered in M; and for supplying a new charge of material, the air tight silos or hoppers T connected with pipes $T_1$ serve for the feeding of the furnace with the reacting materials. Condenser C may also, if necessary, be cleaned and the solid metal which is contained therein is removed. While the furnace is working, the temperature is controlled with an optical pyrometer through the eye-glass L. The vessel F is cooled by the water distributor R. A layer of slag D solidifies inside the walls of the vessel F and acts as a thermal insulator.

*Example*

The slag bath may have the following composition:

|  | Per cent |
|---|---|
| $SiO_2$ | 25-30 |
| $Al_2O_3$ | 15-20 |
| CaO | 45-50 |
| MgO | 0-5 |

The vessel F contains 1,500 kilos of this slag and the current leading electrodes are wholly submerged by the same. The hoppers T may be filled with a mixture containing:

18% silico-aluminum with 60% Si and 30% Al
66% decarbonated dolomite with 34% MgO
16% magnesia with 90% MgO the charge is preferably ground so as to pass through 50 mesh screen. Heating current is fed in by the electrodes E; when the temperature of the molten slag reaches 1500° C., and the vacuum is 25 mm. Hg, valve H controlling communication with a vacuum pump is closed to cut the vessel from the pump, then valve U is opened and 150 kilos of the above mixture are allowed to fall on the molten slag surface. Then U is shut and three minutes later H is opened. The vacuum quickly reaches 25 mm. Hg. Through contact with the cold charge, the surface temperature of the slag lowers to 1350°, reduction immediately begins in the solid mixture, magnesium escapes and is condensed on C. The reaction products (silica, alumina and lime) are incorporated in succession with the molten slag. When all the magnesium has escaped and the temperature of the slag has again reached 1500° C., a new batch of the mixture may be added.

The operation is repeated until the vessel F is filled with molten slag which takes about twenty-two hours. Then the vacuum is broken and the excess of slag is poured through the outlet S by removing the plug which closes it. The pot M is opened and an ingot of 270 kilos of metal is removed; 30 kilos of solid metal are recovered from the condenser C. Then the hoppers T are again filled with the mixture, the apertures of the furnace are closed and a new operation is carried out.

We claim as our invention:

1. The method of recovering metallic magnesium from MgO (or a substance containing MgO) by reduction in the solid phase which comprises charging a furnace with a bath of molten slag, mixing MgO with a reducing agent and bringing the mixture into contact with the surface of said bath heated above the temperature at which the ingredients of said mixture will react, and characterized by this: that the ratio between the weight of the mixture and the weight of the slag is equal to $$\frac{T-F}{T}$$

where T is the temperature of the bath in degrees centigrade before its contact with the mixture and F the melting point of the slag in degrees centigrade, whereby a partial solidification of the upper part of the molten slag is obtained for the whole duration of the reduction without any substantial slowing down of the reaction rate.

2. The method of recovering metallic magnesium from MgO (or a substance containing MgO) by reduction in the solid phase which comprises charging a furnace with a bath of molten slag, mixing MgO with a reducing agent and bringing the mixture into contact with the surface of said bath heated above the temperature at which the ingredients of said mixture will react, and characterized by this: that the ratio between the weight of the mixture and the weight of the slag does not vary more than 30% from the value $$\frac{T-F}{T}$$

where T is the temperature of the bath in degrees centigrade before its contact with said mixture and F the melting point of the slag in degrees centigrade, whereby upon contact of said mixture with the bath a partial solidification of the upper part of the bath rapidly takes place and prevents said mixture from penetrating into the bath until substantially all of its contained magnesium has been released as metal vapor by the heat of the bath.

3. The method of recovering metallic magnesium from MgO (or a substance containing MgO) by reduction in the solid phase which comprises charging a furnace with a bath of molten slag, mixing MgO with a reducing agent and bringing the mixture into contact with the surface of said bath heated above the temperature at which the ingredients of said mixture will react, and characterized by this: that the ratio between the weight of the mixture and the weight of the slag does not vary more than 10% from the value $$\frac{T-F}{T}$$

where T is the temperature of the bath in degrees centigrade before its contact with said mixture and F the melting point of the slag in degrees centigrade, whereby upon contact of said mixture with the bath a partial solidification of the upper part of the bath rapidly takes place and prevents said mixture from penetrating into the bath until substantially all of its contained magnesium has been released as metal vapor by the heat of the bath.

4. A method according to claim 2 in which the melting point of the slag is approximately 1350° C., the temperature of the slag before it is contacted by the mixture is within the range 1500° C. to 1650° C. and the weight of the mixture is between 10% and 18% of the weight of the slag.

5. A method according to claim 2 in which the slag is composed of oxides formed by the reduction of the MgO.

6. A method according to claim 2 in which the slag is electrically heated by Joule effect and the current supplied through electrodes immersed in the slag.

7. A method according to claim 2 in which the reducing agent consists partly of silicon and partly of aluminum.

8. A method according to claim 2 in which the reducing agent consists of ferro-silicon.

9. A method according to claim 2 in which the reducing agent consists of silico-aluminum.

10. A method according to claim 2 in which the reduction occurs at a pressure below that of one atmosphere.

11. A method according to claim 2 in which the reduction occurs at a pressure ranging between 20 and 100 millimeters of mercury.

12. A method according to claim 2 in which reduction occurs under reduced pressure and in which communication is cut between the zone of reduction and the zone where reduced pressure is created, before each batch of the mixture is introduced into the zone of reduction and remains cut while said batch is introduced and for a few minutes thereafter.

13. A method according to claim 2 in which, while heat is continuously supplied to the bath, separate batches of the mixture are successively poured on the surface of the bath, and each batch reduced before the succeeding batch is poured.

14. The method of recovering metallic magnesium from MgO (or a substance containing MgO) by reduction in the solid phase, which comprises charging a furnace with slag-forming ingredients, heating said ingredients to form a molten bath, mixing MgO with a reducing agent and bringing the mixture into contact with the surface of said bath while the temperature of the bath is above that at which the MgO and the reducing agent will react, and characterized by this: that the ratio between the weight of said mixture and the weight of the bath does not vary more than 30% from the value $$\frac{T-F}{T}$$

where T is the temperature in degrees centigrade of the bath before its contact with said mixture and F the melting point of the slag in degrees centigrade, whereby upon contact of said mixture and the bath a partial solidification of the upper part of the bath rapidly takes place and prevents said mixture from penetrating into the bath until substantially all of its contained magnesium has been released as vapor by the heat of the bath.

References Cited in the file of this patent

UNITED STATES PATENTS

| | | |
|---|---|---|
| 1,647,279 | De Saulles | Nov. 1, 1927 |
| 1,878,939 | Lester | Sept. 20, 1932 |
| 2,011,288 | Kemmer | Aug. 13, 1935 |
| 2,099,151 | Vogt | Nov. 16, 1937 |
| 2,224,160 | Peake et al. | Dec. 10, 1940 |
| 2,251,968 | Adamoli | Aug. 12, 1941 |